March 13, 1951  F. H. MANGELSDORF  2,545,367
APPARATUS FOR DECORTICATING AND DECELLING BEET SEEDS
WITH RECIRCULATION OF OVERSIZE SEEDS
Filed Jan. 7, 1947  4 Sheets-Sheet 1
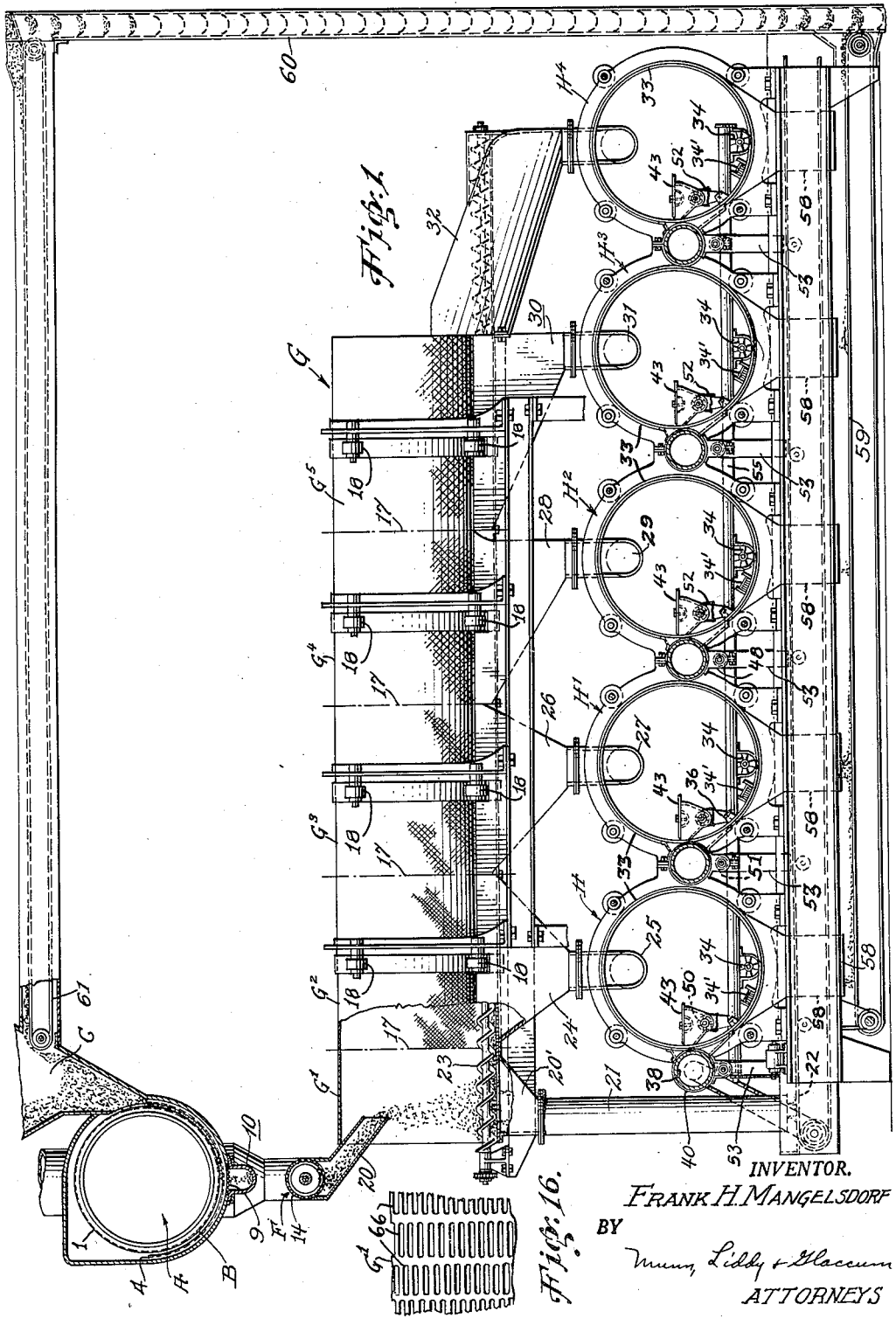
INVENTOR.
FRANK H. MANGELSDORF
BY
Murry, Liddy & Glaccum
ATTORNEYS March 13, 1951  F. H. MANGELSDORF  2,545,367
APPARATUS FOR DECORTICATING AND DECELLING BEET SEEDS
WITH RECIRCULATION OF OVERSIZE SEEDS
Filed Jan. 7, 1947  4 Sheets-Sheet 2
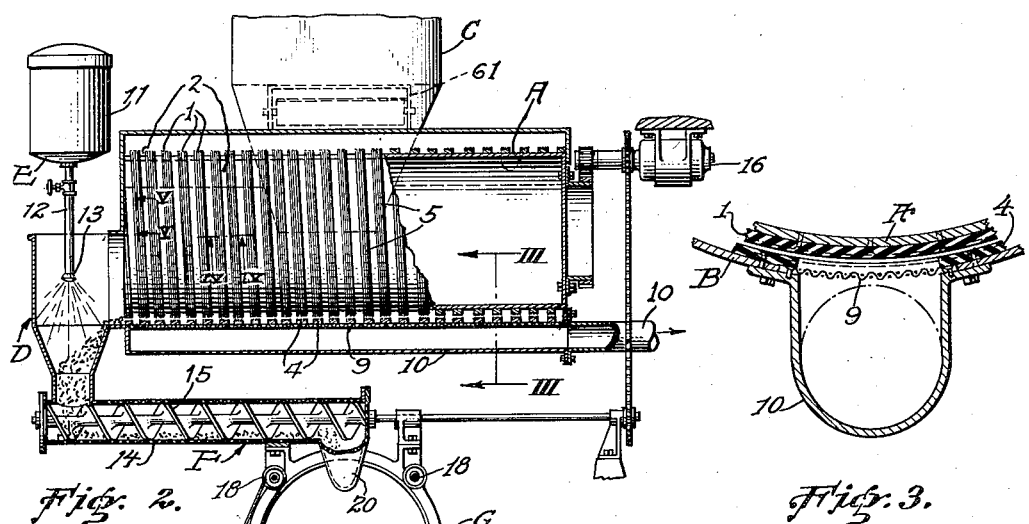
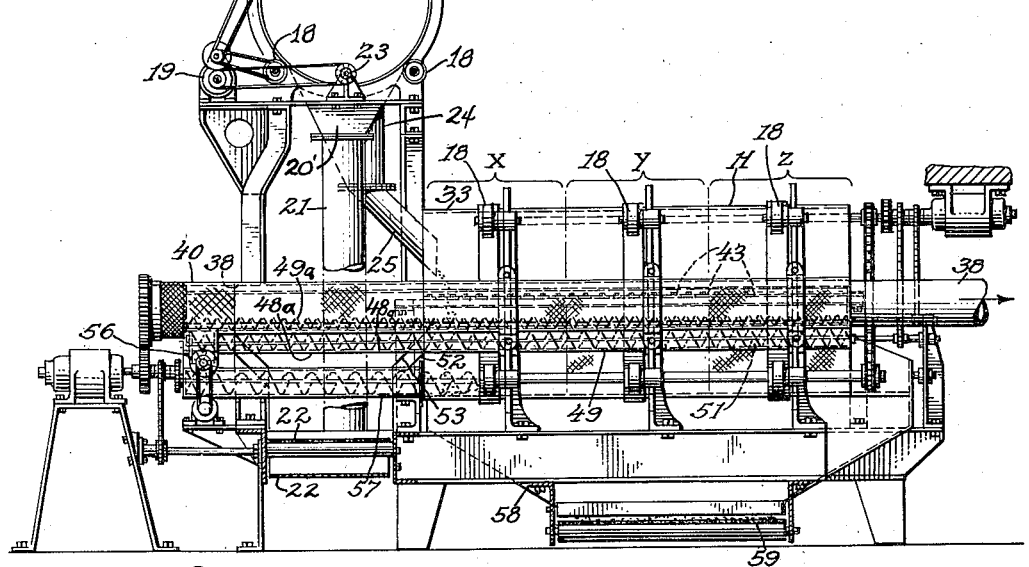
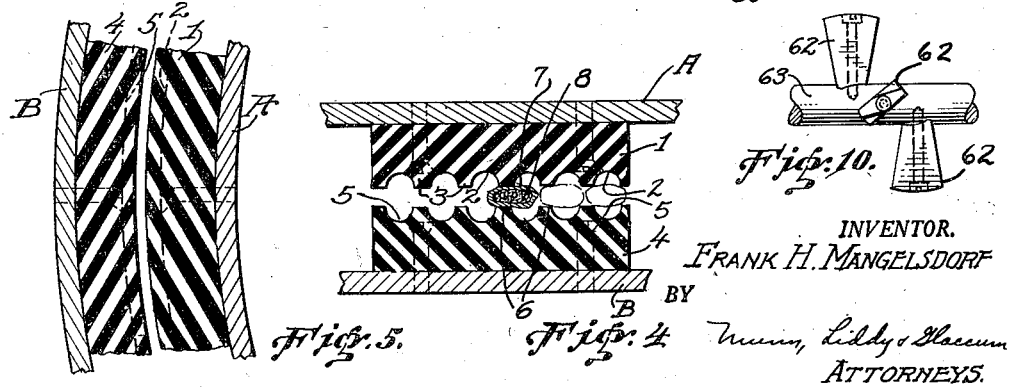
INVENTOR.
FRANK H. MANGELSDORF
BY
ATTORNEYS.

March 13, 1951   F. H. MANGELSDORF   2,545,367
APPARATUS FOR DECORTICATING AND DECELLING BEET SEEDS
WITH RECIRCULATION OF OVERSIZE SEEDS
Filed Jan. 7, 1947   4 Sheets-Sheet 3

INVENTOR.
FRANK H. MANGELSDORF
BY
Munn, Liddy & Glaccum
ATTORNEYS.

March 13, 1951  F. H. MANGELSDORF  2,545,367
APPARATUS FOR DECORTICATING AND DECELLING BEET SEEDS
WITH RECIRCULATION OF OVERSIZE SEEDS
Filed Jan. 7, 1947  4 Sheets-Sheet 4
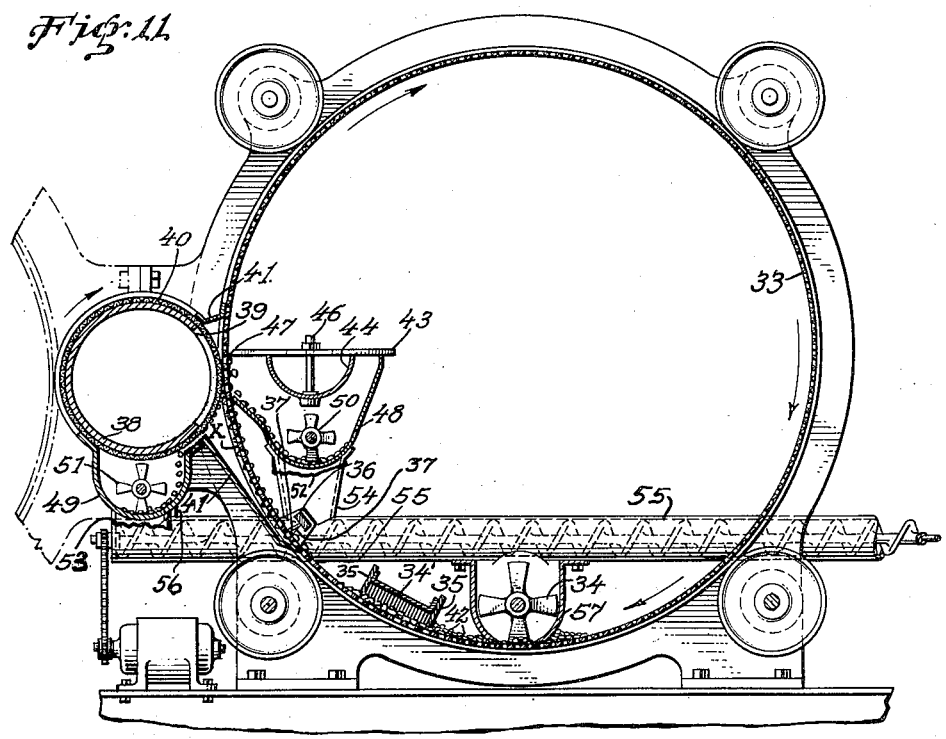
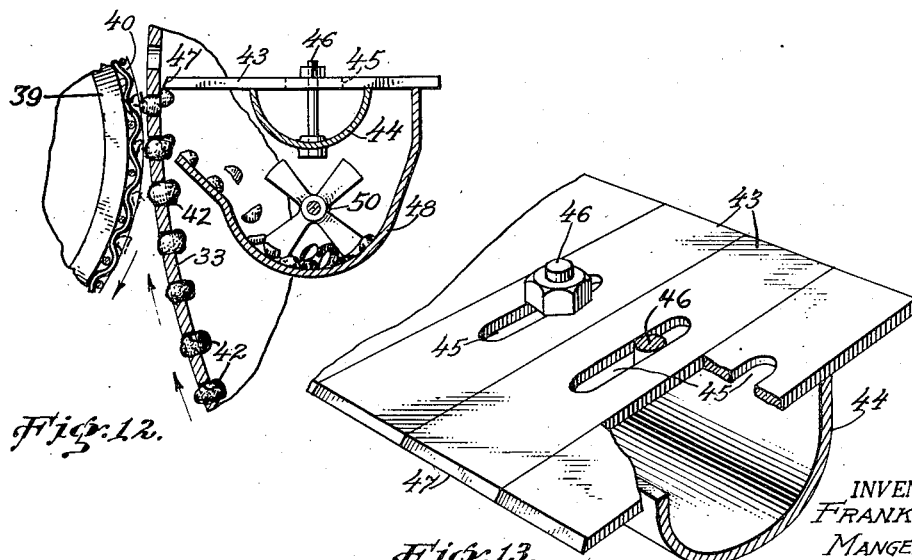
INVENTOR.
FRANK H. MANGELSDORF
BY
ATTORNEYS.

Patented Mar. 13, 1951

2,545,367

UNITED STATES PATENT OFFICE 2,545,367

APPARATUS FOR DECORTICATING AND DE-CELLING BEET SEEDS WITH RECIRCULA-TION OF OVERSIZE SEEDS

Frank H. Mangelsdorf, Burlingame, Calif.

Application January 7, 1947, Serial No. 720,590

3 Claims. (Cl. 146—76)

An object of my invention is to provide an improvement over my two copending applications, Serial 626,939, filed November 6, 1945, on Method of and Apparatus for Processing Seeds, and Serial 641,234, filed January 15, 1946, now abandoned, on a Process and Apparatus for Preparing Seeds. I have found that a beet seed is actually a pod embodying a multiple number of single celled seeds, the pod being in the shape of an irregular cylinder while the individual seed cells are flat. There is a certain degree of cleavage between the component cells, which when broken permits separation through screens of suitable size and shape. My present invention provides a process for first decorticating the beet seeds or the like and then separating the plurality of single cells into single units of one cell each.

A further object of my invention is to provide a method for decorticating and decelling beet seeds in which the seeds are coated with a solution after they are decorticated, the solution drying as a thin layer around the cells and aiding in the subsequent breaking of the cells into their individual units.

The process is continuous and employs novel means for removing the hulls and for causing the seeds to repeat the decelling cycle until they have been reduced to single cells. The invention provides for the instant removal of any single celled seeds from any further unnecessary and continued processing. Where certain seeds are of a size so large as to pass entirely through the decelling step, such seeds are returned to the decorticator for further processing.

Other objects and advantages will appear in the following specification, and the novel features of the device will be particularly pointed out in the appended claims.

My invention is illustrated in the accompanying drawings forming a part of this application, in which:

Figure 1 is a side elevation of the apparatus for carrying out my process of decorticating and decelling beet seeds or the like portions of the apparatus being shown in section;

Figure 2 is a front elevation of Figure 1 with portions of the apparatus being shown in section;

Figure 3 is an enlarged transverse section of the decorticator suction pipe and is taken along the line III—III of Figure 2;

Figure 4 is an enlarged longitudinal section through a portion of the decorticator and is taken along the line IV—IV of Figure 2;

Figure 5 is an enlarged transverse section through a portion of the decorticator and is taken along the line V—V of Figure 2;

Figure 10 illustrates how the screw conveyors can have their flights adjusted angularly;

Figure 11 is an enlarged transverse section through one of the seed decellers;

Figure 12 is an enlarged sectional view of the seed decelling means;

Figure 13 is an enlarged perspective view of the seed decelling bars;

Figure 16 shows a portion of the screen for single celled seeds.

While I have shown only the preferred forms of my invention, it should be understood that various changes or modifications may be made within the scope of the appended claims without departing from the spirit and scope of the invention.

Figure 6:
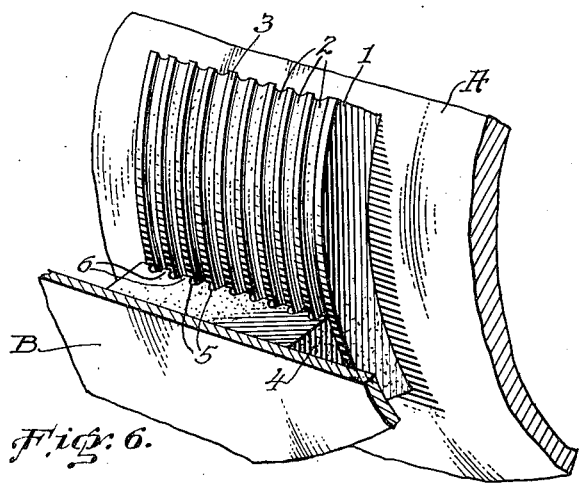
Figure 6 is a perspective view on an enlarged scale of a portion of a decorticating drum and concave.

In carrying out my invention, I provide a decorticator including a cylinder A and this cylinder is rotatably mounted in a concave indicated generally at B. The cylinder A as shown in Figure 2 is spirally wound with a strip of rubber that has longitudinal corrugations therein. Figure 6 shows an enlarged portion of the decorticating cylinder A and also shows the strip 1 of rubber provided with longitudinally extending grooves 2 that form longitudinally extending ribs 3. The same figure shows the concave B provided with strip sections 4 of corrugated rubber, these sections being spirally arranged and provided with grooves 5 and ribs 6 that cooperate with the grooves and ribs of the spiral strip 1. The spiral convolutions of the strip are spaced apart and so are likewise the sections 4.

Figure 14:
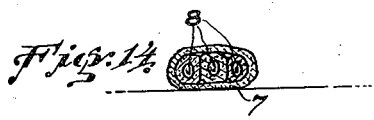
Figure 14 is a greatly enlarged sectional view through a beet seed.

In Figure 14 a greatly enlarged beet seed is illustrated in section and the hull or pod is shown at 7 and the plurality of single cells are shown at 8. Figure 4 illustrates how the beet seeds pass between the rubber strips 1 and 4 of the decorticating cylinder A and the concave B. The space between the ribs 3 of the strip 1 and the ribs 6 of the strips 4 is such as to permit the beet seeds to pass therebetween but the ribs will rub off the hull or pod 7 from around the group of single cells 8. The decorticating cylinder A can be of any length desired and I show a hopper C for feeding beet seeds to the spaces between the drum and the concave in Figure 1.

The lower portion of the concave B has a longitudinally extending screen 9 communicating with a suction pipe 10. The pods or hulls of the beet seeds when removed from the seeds by the decorticator will drop to the lower portion of the concave and will be sucked through the screen 9 and into the suction pipe 10 and conveyed away. The screen 9 has a mesh small enough to prevent any single or multiple seeds from passing therethrough. The decorticator is especially designed so as not to damage any seeds.

Figure 2 shows the decorticating cylinder communicating with a discharge spout D and I provide a seed coater E for receiving seed from the discharge spout. The seed coater can take any shape desired and I show a container 11 for a solution of methocel or dextrine and a valved pipe 12 leading from the container and terminating in a nozzle 13 for spraying the decorticated seeds as they leave the drum and pass into the discharge spout. The thin coating applied to the decorticated seeds will minimize any injury to the single celled seeds.

Figure 2 also shows a mixing conveyor and seed dryer indicated generally at F and the dryer comprises a cylindrical screen 14 in which a screw conveyor 15 is mounted. The conveyor has the usual mixing paddles and the screen 14 has obstructing bars. The conveyor and the decorticator may be operated by a single motor 16 in the manner illustrated in Figure 2, although I do not wish to be confined to any particular actuating means. The sides and bottom of the screen 14 has number "5" round perforations for greater aeration. As the coated seeds are moved through the screened conveyor and dryer F, they will be thoroughly dried and then the seeds are ready to be moved into a sizing reel or drum, indicated generally at G, which will not only remove all extraneous refuse and any single celled seeds, but will grade the decorticated seeds into five different but uniform sizes.

Reference to Figure 1 shows the drum as being divided into five sections indicated generally at G1, G2, G3, G4 and G5. I show these sections in Figure 1, separated from each other by dot-dash lines 17, although there are no transverse partitions that extend across the drum at these points. Figure 2 illustrates how the sizing reel G is strongly constructed and suitably reinforced with outside bands for freeing the inside. The reel may be rotatably supported by a plurality of rollers 18 placed around its periphery and certain of these rollers may be operatively connected to a source of power such as a motor 19. Figure 1 shows how four sets of the rollers rotatably support the drum although this number may be changed.

A chute 20 leads from the seed dryer F into the first or front section G1 of the seed sizing reel G. The section G1 has elongated openings or slots 66 therein of a size which will permit only single celled seeds to pass therethrough, see Figure 16. Any seeds that have more than one cell cannot pass through the slots in this portion of the drum. A hopper 20' is placed under the front drum section G1 and receives any single celled seeds and conveys these to a conduit 21 which in turn drops them upon a conveyor belt 22, see Figure 2.

I provide a conveyor screw 23 at the bottom of the sizing drum and having rubber paddles for contacting the inner drum surface and for moving the seeds from the front end G1 of the drum toward the rear end G5. The second section G2 has round perforations large enough to receive seeds of a certain size. These round openings are 7/64 of an inch in diameter. Any seeds that can pass through round openings of this size will be received in a trough 24 and will be conveyed to a deceller H by a chute 25. The rubber paddles on the screw conveyor 23 can be adjusted to move the seeds along the reel G at the desired speed. The conveyor is shown schematically as a screw in Figure 1.

The next section G3 has round perforations 7½ sixty-fourths of an inch in diameter. Seeds passing through these openings will be received in a hopper 26 and conveyed to a seed deceller H1 by means of a chute 27.

The section G4 has openings 8 sixty-fourths of an inch therein and any seeds passing therethrough will be received in a hopper 28 which communicates with a chute 29 that delivers the seeds to a deceller H2. The last section G5 of the sizing drum G has openings 9 sixty-fourths of an inch therein. A hopper 30 receives the seeds from this section and delivers them by means of a chute 31 to a deceller H3. Any seeds passing beyond the end section G5 will be delivered to an end chute 32 that conveys them to another deceller H4. Any means for rotating the conveyor screw 23 may be used, and in Figure 2 I show this conveyor connected to the motor 19. The conveyor will keep all of the seeds moving along the sizing drum and should any of the seeds fail to pass into the hoppers 20', 24, 26, 28 and 30, the screw will convey them to the chute 32.

The construction of each deceller H to H4, inclusive, is identical and therefore a description of one will suffice for all. In Figure 2 I show the deceller H with the chute 25 conveying seed thereinto. This deceller is divided into three sections indicated by the brackets and the small letters x, y and z. The deceller drum 33 has a plurality of round openings therein and the openings of the smallest size are 5½ sixty-fourths of an inch and are in the section x, the openings of a larger size are 6 sixty-fourths of an inch and are in the section y, and the largest openings are 6½ sixty-fourths and are in the section z. A screw conveyor 34 extends along the bottom of the drum 33 and moves the seeds from the section x to the section z.

The deceller H1 has three sets of round openings 6½ sixty-fourths, 7 sixty-fourths and 7½ sixty-fourths and receives its seeds from the sizing reel section G3. The deceller H2 has three sets of round openings 7, 7½ and 7¾ sixty-fourths and receives its seeds from the reel section G4. The deceller H3 has three sets of round openings 7½, 8 and 8½ sixty-fourths for receiving seeds from the reel section G5, and the deceller H4 has three sets of round openings 8½, 9 and 10 for receiving seeds from the chute 32.

In Figure 11, I show an enlarged detail of the drum 33 and it will be seen that the drum rotates in a clockwise direction. I provide a plurality of seed spreading brushes 34 that "float" between rigid side members 35 and have bristles that brush against the seeds and spread them so that all of the openings in the drum will each receive a seed.

The openings are all of a size that will hold the seeds and not permit them to pass through the drum. A second elongated brush 36 provided with a single row of bristles 37 causes only one layer of seeds to pass thereunder and to enter the suction portion X of the drum 33.

The suction is created by a suction pipe 38 that parallels the drum 33 and has a slot 39 having a length coextensive with the length of the drum. A cylindrical screen 40 of a mesh too fine to permit seeds to pass therethrough revolves around the suction pipe 38 in a clockwise direction. A hood-like structure 41 extends from the slot 39 to the drum 33 and this will cause air to be sucked from the drum 33 and to enter the suction pipe 38. The suction created is sufficient to hold the seeds in the openings 42 provided in the drum 33, see Figure 12. The seeds cannot pass through the openings and are carried up to a plurality of breaker bars shown at 43 in Figure 13.

The bars are supported by a semi-cylindrical member 44 and are slotted at 45 to receive bolts 46. The bars 43 have seed breaking edges 47 that are placed close to the inner surface of the drum 33 and these edges will sever the seeds along the cleavage lines of the cells as the seeds are carried upwardly thereby. This severing action will break the seeds into fewer cells and the portions broken off within the drum 33 will fall into an inner trough 48. The outer portions will be sucked against the screen 40 and will be carried in a clockwise direction toward an outer trough 49. The inner trough 48 has a screw conveyor 50 therein and a second screw conveyor 51 is placed in the outer trough 49.

Figure 2 shows the inner trough 48 projecting in front of the drum 33. A hopper 52 is placed under a perforated portion 48a of the inner trough and the perforations of this portion are large enough to permit only single celled seeds to pass therethrough and to be guided to the conveyor belt 22. The outer trough 49 also extends beyond the front end of the drum 33 and a hopper 53 is placed under a perforated portion of this trough and receives single celled seeds and delivers them to the conveyor belt 22. Single celled seeds are somewhat flat in shape and can pass through the slotted portions 48a and 49a of the troughs.

Any seeds that do not drop through these slotted perforations are carried forwardly along the troughs. At the front end of the trough 48 I provide a chute 54 that conveys the seed to a screw conveyor 55, see Figure 11. At the forward end of the trough 49 I provide a passage 56 that delivers seed to the same screw conveyor 55. The rotation of this conveyor is such as to carry the seed to a trough 57 that extends in front of the drum 33 and receives the front portion of the screw conveyor 34. The conveyor 34 will move the seed along the trough 57 to the drum 33 and the process of spreading and breaking or decelling of the seed will be repeated. Of course the other decellers will handle seeds of other sizes in the same manner as already indicated.

Should by any chance some seed pass through the drum 33, it will be received in a hopper 58 that conveys the seed to a conveyor belt 59. The hopper 58 extends beyond the rear end of the drum 33 so as to receive any seed that passes beyond this end. Figure 1 shows the conveyor belt 59 extending under all of the hoppers 58 provided for the decellers H to H4, inclusive. The belt conveyor carries the seed to an elevator 60 which in turn drops it upon an upper conveyor 61 that carries the seed back to the main hopper C. This seed passes through the decorticator for the second time. The screw conveyor 55 is common to all of the decellers H to H4, inclusive, and yet only portions of the conveyor are used for carrying the larger seeds from the troughs 48 and 49 back to the proper drums 33. It is possible to feed the seeds from the troughs 48 and 49 by gravity to the drum 33 and thus do away with the conveyor 55.

From the foregoing description of the various parts of the device, the operation thereof may be readily understood.

I have already set forth how the seeds are decorticated and how the sizing drum or reel delivers seeds of the proper size to the particular decellers. The hopper 20' receives any single cell seeds that might be delivered from the decorticator. I have found that the seeds can be broken into individual cells more readily if they are coated by the seed coater E. In each deceller the seeds go through a continuous process of breaking until they reach a single cell state, whereupon they are delivered to the belt 22. Any larger seeds are carried back to the decorticator and will go through the entire process once more. The process is continuous and the belt 22 receives the single cell seeds and these may be carried to the packaging place, not shown.

Figure 7:
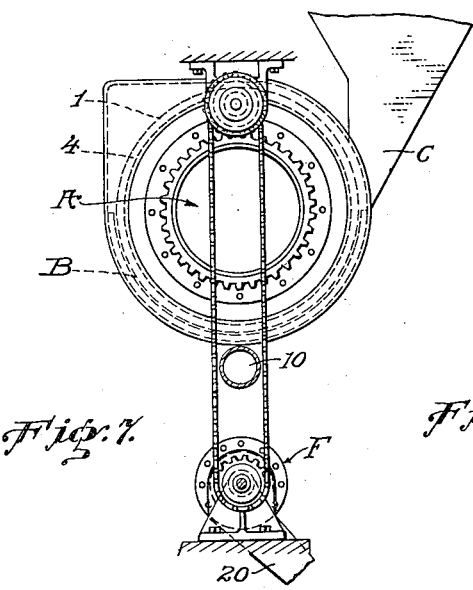
Figure 7 is a view illustrating the mechanical connection between a drive mechanism for the decorticator drum and the drive mechanism for the seed dryer.
Figure 9:
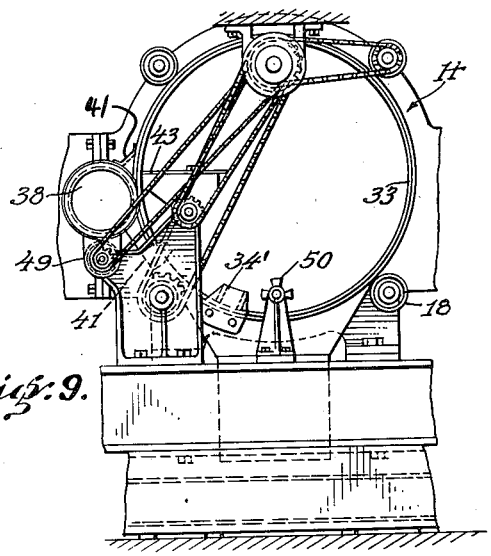
Figure 9 is a rear end view of the same deceller.
Figure 8:
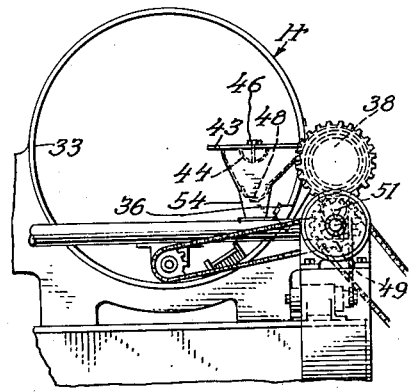
Figure 8 is a front end view of one of the seed decellers.

In Figure 10, I show how the screw conveyor can have its flights 62 adjusted angularly on the central shaft 63. Each screw conveyor can be regulated in this manner to advance the seeds through the various drums at any desired speed. I have shown the mechanism in Figures 2, 8 and 9 for rotating the decellers H and the screws 34, 50 and 51. Inasmuch as any type of actuating means can be used, a detailed description need not be given. The mechanism for rotating the drum 33 is somewhat the same as that used for rotating the sizing drum G.

Figure 15:
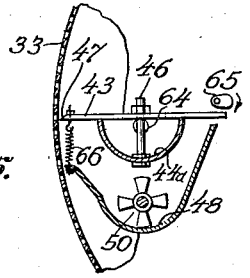
Figure 15 shows a modified form of breaker bar mechanism.

Figure 15 shows a slightly modified form of breaker bar mechanism. The semi-cylindrical member 44a is pivoted at its ends as at 64 and a cam 65 can be rotated for rocking the member in one direction. A spring 66 returns the member to starting position. The breaking edges 47 of the bars 43 will move quickly when the cam frees the bars and a faster cleaving movement will result causing the seeds to be separated at their lines of cleavage even though the screen 33 revolves slowly. This will vary and control the degree of impact in accordance with the desire of the operator.

Although Figure 12 shows the revolving screen 40 placed close to the perforated cylinder 33, sufficient space may be provided between the two for the seed portions sucked against the screen to pass any extending portions of the seeds received in the openings 42 in the cylinder 33 and being carried up to the breaker bars 43. In this way there will be no interference between the oppositely moving adjacent surfaces of the screen 40 and the cylinder 33.

I claim:

1. A decelling machine for hulled beet seeds or the like comprising a rotatable cylinder open at its inlet and outlet ends, the length of the cylinder being divided into a plurality of perforated sections of gradually increasing size from the inlet to the outlet end, means for advancing seed along the bottom of the cylinder from the inlet to the outlet end, means for spreading the seed over the bottom of the rotating cylinder so the perforations will each receive a single seed, means for removing all seeds not received in a perforation, means for creating a suction on the outer surface of that portion of the cylinder receiving the seeds for holding the seeds in place, means for breaking the seeds along lines of cleavage as the cylinder moves the seeds past the seed breaking means, means for sorting and separating single celled seeds broken off on the inner surface of the cylinder and for returning multicelled seeds to the seed advancing means for again advancing them along the cylinder bottom, means for sucking the remaining seed portions in the openings, through the openings, and means for sorting and separating single multicelled seeds to the seed advancing means for moving them along the cylinder bottom for further treatment.

2. A decelling machine for hulled beet seeds or the like comprising a rotatable cylinder open at its inlet and outlet ends, the length of the cylinder being divided into a plurality of perforated sections of gradually increasing size from the inlet to the outlet end, means for advancing seed along the bottom of the cylinder from the inlet to the outlet end, means for spreading the seed over the bottom of the rotating cylinder so the perforations will each receive a single seed, means for removing all seeds not received in a perforation, means for creating a suction on the outer surface of that portion of the cylinder receiving the seeds for holding the seeds in place, means for breaking the seeds along lines of cleavage as the cylinder moves the seeds past the seed breaking means, means for sorting and separating single celled seeds broken off on the inner surface of the cylinder and for returning multicelled seeds to the seed advancing means for again advancing them along the cylinder bottom, means for sucking the remaining seed portions in the openings, through the openings, and means for sorting and separating single celled seeds from the last-named means and for returning multicelled seeds to the seed advancing means for moving them along the cylinder bottom for further treatment, a decorticator for oversized seeds received in the cylinder and too large to be received in any of the cylinder openings, means for receiving the oversized seed from the seed advancing means and for conveying it to the decorticator, and means for conveying decorticated seed from the decorticator to said cylinder.

3. A decelling machine for hulled beet seeds or the like comprising a rotatable cylinder open at its inlet and outlet ends, the length of the cylinder being divided into a plurality of perforated sections of gradually increasing size from the inlet to the outlet end, means for advancing seed along the bottom of the cylinder from the inlet to the outlet end, means for spreading the seed over the bottom of the rotating cylinder so the perforations will each receive a single seed, means for removing all seeds not received in a perforation, means for creating a suction on the outer surface of that portion of the cylinder receiving the seeds for holding the seeds in place, means for breaking the seeds along lines of cleavage as the cylinder moves the seeds past the seed breaking means, means for sorting and separating single celled seeds broken off on the inner surface of the cylinder and for returning multicelled seeds to the seed advancing means for again advancing them along the cylinder bottom, means for sucking the remaining seed portions in the openings, through the openings, and means for sorting and separating single multicelled seeds to the seed advancing means for moving them along the cylinder bottom for further treatment, a decorticator for oversized seeds received in the cylinder and too large to be received in any of the cylinder openings, means for receiving the oversized seed from the seed advancing means and for conveying it to the decorticator, and means for conveying decorticated seed from the decorticator to said cylinder, a hopper extending the length of the cylinder for receiving seeds passing through the perforations in the cylinder, said hopper delivering such seed to the means that conveys the seed to the decorticator.

FRANK H. MANGELSDORF.

REFERENCES CITED

The following references are of record in the file of this patent:

UNITED STATES PATENTS

| Number | Name | Date |
|---|---|---|
| 228,310 | Brubaker | June 1, 1880 |
| 238,194 | Winterhalter | Feb. 22, 1881 |
| 302,693 | Van Duzee | July 29, 1884 |
| 407,578 | Cranson | July 23, 1889 |
| 493,065 | Campbell | Mar. 7, 1893 |
| 704,610 | Black | July 15, 1902 |
| 1,116,221 | Beyschlag | Nov. 3, 1914 |
| 1,242,136 | Buffum | Oct. 9, 1917 |
| 1,726,435 | Haller | Aug. 27, 1929 |
| 1,897,664 | Hansen | Feb. 14, 1933 |
| 2,075,159 | Andreasen | Mar. 30, 1937 |
| 2,373,361 | Walter | Apr. 10, 1945 |
| 2,376,062 | Kerr | May 15, 1945 |
| 2,428,319 | Orkney | Sept. 30, 1947 |